(12) United States Patent
Weber

(10) Patent No.: US 8,845,422 B2
(45) Date of Patent: Sep. 30, 2014

(54) REMOTE LOGIN FOR A WAGERING GAME MACHINE

(75) Inventor: Justin C. Weber, Chicago, IL (US)

(73) Assignee: WMS Gaming, Inc., Waukegan, IL (US)

(\*) Notice: Subject to any disclaimer, the term of this patent is extended or adjusted under 35 U.S.C. 154(b) by 126 days.

(21) Appl. No.: 13/606,872

(22) Filed: Sep. 7, 2012

(65) Prior Publication Data

US 2013/0244772 A1 Sep. 19, 2013

Related U.S. Application Data

(60) Provisional application No. 61/532,899, filed on Sep. 9, 2011.

(51) Int. Cl.
*G06F 12/14* (2006.01)
*G07F 17/32* (2006.01)
*G06F 21/42* (2013.01)

(52) U.S. Cl.
CPC ........ *G06F 12/1458* (2013.01); *G07F 17/3225* (2013.01); *G07F 17/3241* (2013.01); *G06F 21/42* (2013.01)
USPC .......................................................... 463/29

(58) Field of Classification Search
USPC .......................................................... 463/29
See application file for complete search history.

(56) References Cited

U.S. PATENT DOCUMENTS

| | | | |
|---|---|---|---|
| 7,285,046 B2 \* | 10/2007 | Papulov ........................... | 463/29 |
| 7,611,409 B2 \* | 11/2009 | Muir et al. ........................ | 463/29 |
| 7,925,577 B2 | 4/2011 | Crosthwaite et al. | |
| 8,201,229 B2 | 6/2012 | Ruppert et al. | |
| 2006/0046849 A1 \* | 3/2006 | Kovacs ........................... | 463/39 |
| 2006/0165060 A1 \* | 7/2006 | Dua ............................... | 370/352 |
| 2007/0021198 A1 \* | 1/2007 | Muir et al. ........................ | 463/29 |
| 2007/0232397 A1 \* | 10/2007 | Katz ................................ | 463/42 |
| 2008/0096628 A1 \* | 4/2008 | Czyzewski et al. .............. | 463/17 |
| 2008/0113804 A1 \* | 5/2008 | Alderucci ........................ | 463/42 |
| 2009/0183243 A1 | 7/2009 | Ruppert et al. | |
| 2009/0328182 A1 | 12/2009 | Malakapalli et al. | |
| 2010/0331079 A1 \* | 12/2010 | Bytnar et al. .................... | 463/29 |
| 2011/0212772 A1 | 9/2011 | Alderucci | |
| 2011/0269436 A1 | 11/2011 | Porco | |

\* cited by examiner

*Primary Examiner* — David L Lewis
*Assistant Examiner* — Shauna-Kay Hall
(74) *Attorney, Agent, or Firm* — DeLizio Gilliam, PLLC

(57) ABSTRACT

A method includes receiving a login request to an account at a wagering game machine. In response to the login request, the method includes displaying a security token on a display of the wagering game machine. Also in response to the login request, the method includes transmitting the security token to a server, wherein the server is communicatively coupled to the wagering game machine and a mobile device. Also in response to the login request, the method includes receiving, back from the server and at the wagering game machine, authorization for login to the account at the wagering machine, wherein the authorization is based on an earlier login to the account from the mobile device using the login credentials. After receiving the authorization, the method includes logging into the account at the wagering game machine, wherein the logging occurs without inputting of the login credentials at the wagering game machine.

25 Claims, 10 Drawing Sheets

REMOTE LOGIN FOR A WAGERING GAME MACHINE

RELATED APPLICATIONS

This application claims the priority benefit of U.S. Provisional Application Ser. No. 61/532,899 filed Sep. 9, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including remote login for a wagering game machine.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
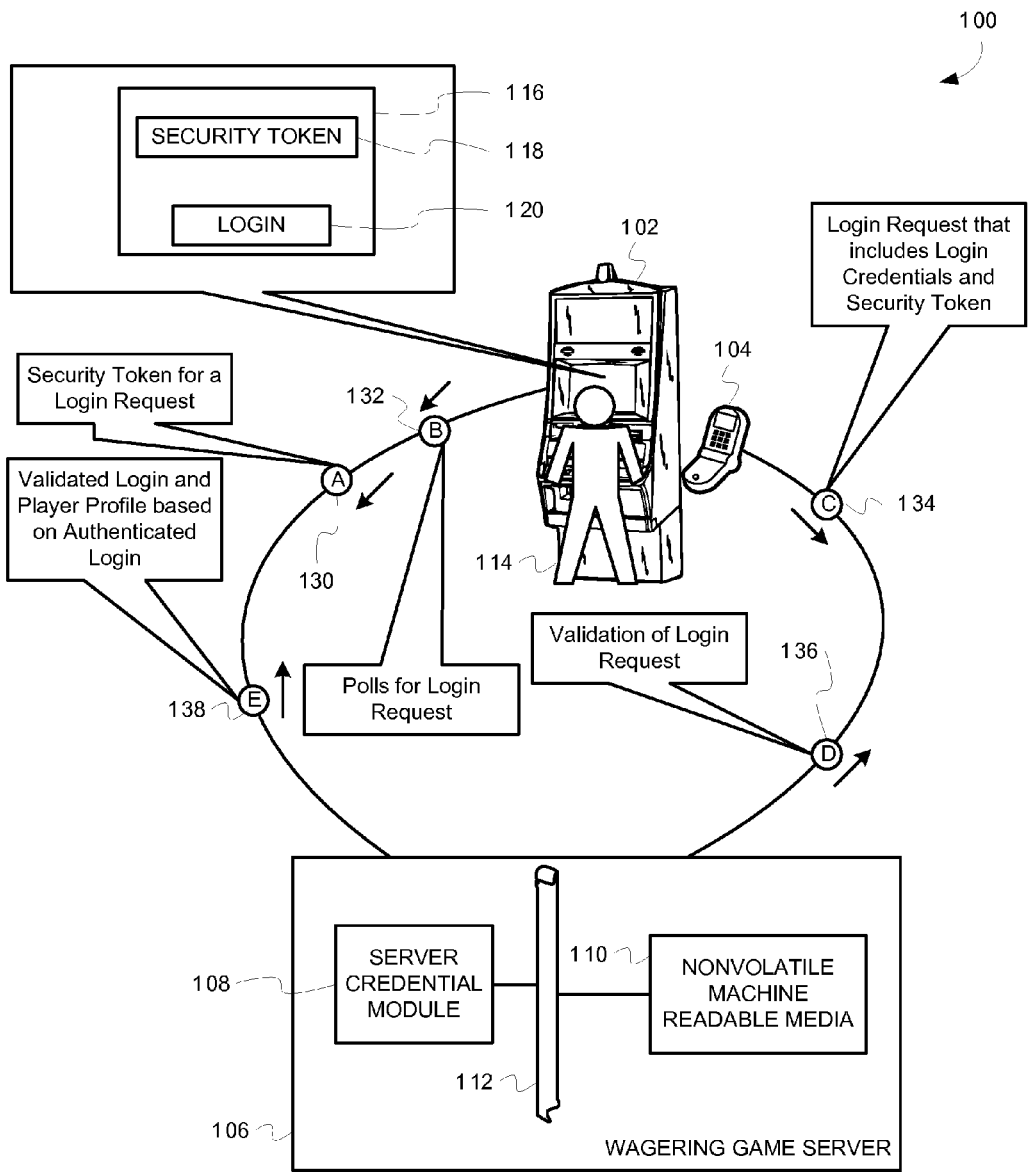
FIG. 1 depicts a system for performing remote login at the wagering game machine, according to some example embodiments.

This description of the embodiments is divided into seven sections. The first section provides an introduction to some example embodiments, while the second section provides a system environment. The third section describes an example mobile device. The fourth section describes example operations performed by some example embodiments. The fifth section describes an example wagering game machine architecture and network environment. The sixth section describes an example wagering game machine and the seventh section presents some general comments.

Introduction

This section provides an introduction to some example embodiments. Some example embodiments provide protection for wagering game players having their login credentials (e.g., username and password) being stolen during login to their account at wagering game machines at wagering game establishments. In particular, some example embodiments provide protection from persons shoulder surfing of wagering game players who are logging to their player accounts at wagering game machines. Some example embodiments enable a wagering game player to provide their login credentials using a mobile device instead of inputting these credentials at the wagering game machine.

In some example embodiments, in response to a wagering game player requesting to perform a remote login to one or more of their player accounts at a wagering game machine, a security token is displayed to the wagering game player on a display of the wagering game machine. For example, the security token can be displayed in response to the wagering game player selecting a login button. The security token can be any alphanumeric value that uniquely identifies the wagering game machine. In some example embodiments, the security token uniquely identifies the wagering game machine for a defined time period (e.g., 10 minutes, 30 minutes, etc.). This security token can be generated locally or remotely at a wagering game server that is communicatively coupled to the wagering game machine. If generated locally at the wagering game machine, the security token is transmitted to the wagering game server.

The wagering game player can then input their login credentials along with the security token (displayed on a display of the wagering game machine) using a device that is separate from the wagering game machine. Using a separate device can be less susceptible to shoulder surfing and other techniques for stealing login credentials. Examples of this separate device can be a mobile device associated with the wagering game player (e.g., smartphone, Personal Digital Assistant (PDA), etc.), a kiosk at the wagering game establishment, etc.

Embodiments herein are described with reference to a mobile device associated with the wagering game player. However, some example embodiments are applicable to any device that is separate from the wagering game machine. If the wagering game player is already logged into their player account on their mobile device, the wagering game player can then input the security token on their mobile device. The mobile device then uploads the login credentials and the security token provided by the wagering game player back to the wagering game server.

In response, the wagering game server can authenticate the login credentials for the player account. If authentic, the wagering game server can associate the security token with the player account. Also, the wagering game server can then provide authentication to the wagering game machine to enable account access by the wagering game player at the wagering game machine. Alternatively or in addition, the wagering game server can download a player profile associated with the player account to the wagering game machine. Accordingly, the wagering game player can access their player profile and account at the wagering game machine without requiring the wagering game player to provide their login credentials at the wagering game machine. Therefore, some example embodiments provide protection for wagering game players having their login credentials being stolen during login.

System Environment

This section describes example system environments and presents structural aspects of some example embodiments. This section includes an example system and GUI displayed on a wagering game machine for performing remote login at the wagering game machine from a separate device (e.g., a mobile device of the wagering game player) using a security token. This section will discuss FIGS. 1-2. The discussion of FIG. 1 will describe a system that provides remote login at the wagering game machine from a separate device. The discussion of FIG. 2 will describe a GUI displayed on a display of a wagering game machine for performing remote login at the wagering game machine. While FIGS. 1-2 are illustrated using a mobile device for remote login at a wagering game machine, some example embodiments can incorporate any device separate from the wagering game machine for remote login at the wagering game machine.

Figure 2:
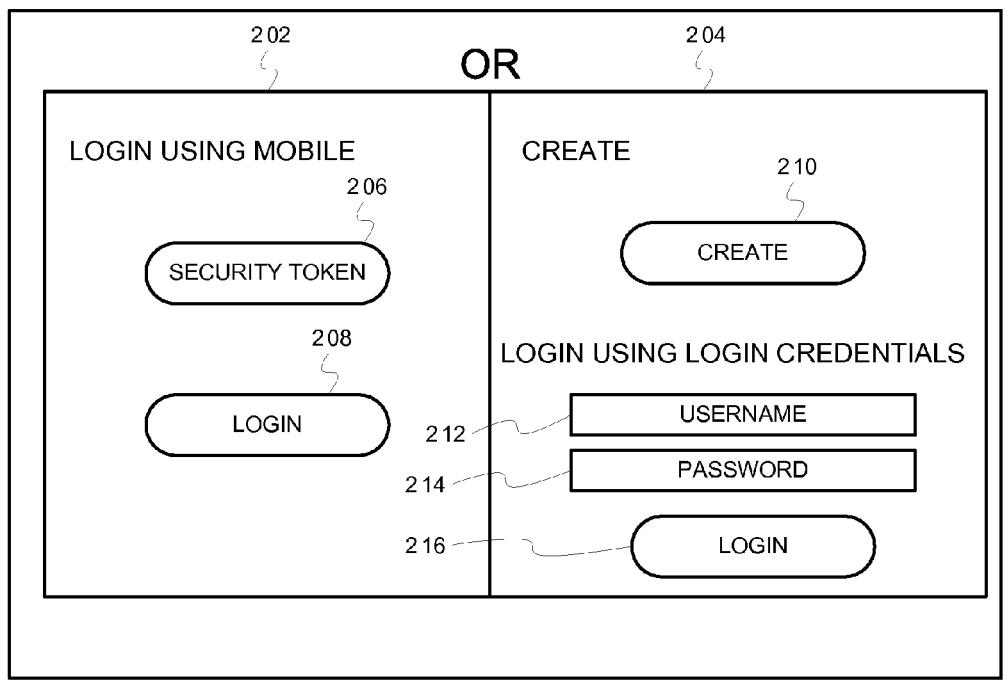
FIG. 2 depicts a Graphical User Interface (GUI) being displayed on a display of a wagering game machine for providing the option for performing remote login at the wagering game machine, according to some example embodiments.

FIG. 1 depicts a system for performing remote login at the wagering game machine, according to some example embodiments. In particular, FIG. 1 depicts a system 100 that includes a wagering game machine 102, a mobile device 104, and a wagering game server 106. The wagering game machine 102, the mobile device 104, and the wagering game server 106 are communicatively coupled together. A wagering game player 114 is in front of the wagering game machine 102. In this example, the mobile device 104 is associated with the wagering game player 114. In some example embodiments, any device separate from the wagering game machine 102 and that has network connectivity can be used to communicate with the wagering game server 106 (e.g., a different person's mobile device, a kiosk in the wagering game establishment, etc.).

The wagering game machine 102 includes a display 116 having a GUI that includes a login button 120 and a display box for displaying a security token 118. A more detailed description of an example GUI for logging into a player account at a wagering game machine is set forth below and described in reference to FIG. 2, which is described in more detail below. A more detailed description of an example of the mobile device 104 is set forth below and described in reference to FIGS. 3-4, which is described in more detail below. Examples of the mobile device 104 can include a smartphone, Personal Digital Assistant (PDA), etc.

The wagering game server 106 includes a server credential module 108 and a nonvolatile machine-readable media 110 that are communicatively coupled together through a communication bus 112. The server credential module 108 can be software, firmware, hardware or a combination thereof. For example, the server credential module 108 can be software executing on a processor (not shown).

The remote login as described herein can be for one or more of a number of player accounts that are accessible at the wagering game machine. The player account can be an account that is specific to the vendor of the wagering game machine. Such an account enables the accrual of achievements, points, awards, etc. based on wagering game play across multiple wagering game sessions. A wagering game player can have an incentive to login to this player account because accrual of achievements, points, awards, etc. unlocks content, advances levels as part of the wagering game play. Such an account can be accessible external to the wagering game machines but is associated with wagering game play of such machines. For example, the account can be accessible through a web-based interface that can be accessible through a mobile-based application. The wagering game player can play nonwagering game activity through this web-based interface to the account that provides for accrual of achievements, points, awards, etc. that can affect wagering game play at the wagering game machines. In some example embodiments, the player account can also be an account that is specific to the wagering game establishment. Such an account can enable the player to perform account-based wagering based on game credits that are associated with the player account. In some example embodiments, this remote login can enable access to all or a multiple of the player accounts.

FIG. 1 illustrates different communications among the different components in the system 100 to provide for remote login at the wagering game machine 102. There are four different communications—a communication 130, a communication 132, a communication 134, a communication 136, and a communication 138. In this example, the wagering game player selects an option to login from their mobile device. As an example, instead of inputting their login credentials at the wagering game machine 102, the wagering game player 114 can select a button at the wagering game machine 102 to perform a login from a separate device. The wagering game player 114 can select the login button 120.

In response to receiving the request from the wagering game player 114 to perform a remote login, the wagering game machine 102 transmits the communication 130 to the wagering game server 106 (shown as reference point A). The communication 130 can include an indicator that a remote login request is being made and the value of the security token 118.

Also, after the communication 130 is transmitted to the wagering game server 106, the wagering game machine 102 can begin polling the wagering game server 106 to determine whether a remote login request from a separate device has been authenticated (the communication 132 shown as reference point B).

Figure 4:
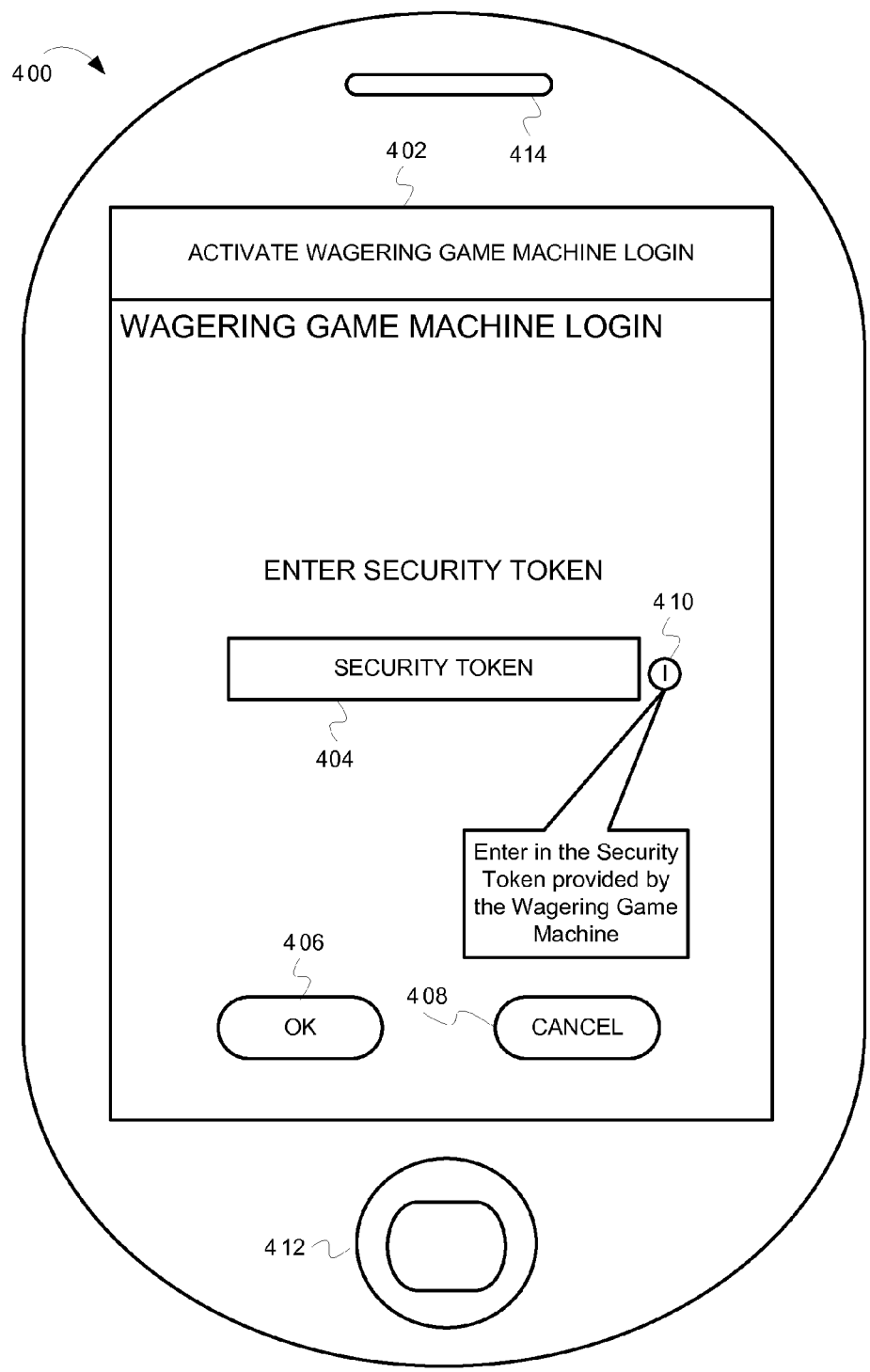
FIG. 4 depicts a Graphical User Interface (GUI) on a display of a mobile device for inputting a security token for remote login at a wagering game machine, according to some example embodiments.

Also, after the security token 118 is displayed on the display 116 of the wagering game machine 102, the wagering game player 114 inputs the value of the security token 118 into the mobile device 104. In some example embodiments, the wagering game player 114 is already logged in or logins to their player account at the mobile device 104 using their login credentials (e.g., username and password). Once logged into their player account, the wagering game player 114 can input the security token 118 at the mobile device 104. For example, the wagering game player 114 can go to an option in their player account to perform a remote login. An example of such a GUI on the mobile device 104 for remote login is illustrated in FIG. 4, which is described in more detail below.

In response to inputting the value the security token 118 into the mobile device 104, the mobile device 104 transmits the communication 134 to the wagering game server 106 (shown as reference point C). The communication 134 can include the login credentials associated with the player account and the value of the security token 118.

In response to receipt of the communication 130 and the communication 134, the server credential module 108 can validate the login credentials for the wagering game player 114 if the wagering game player 114 is not yet logged in. Also, the server credential module 108 can match the value of the security token 118 received from the wagering game machine 102 with the value of the security token 118 received from the mobile device 104. Once these values are matched, the server credential module 108 can associate the value of the security token 118 with the player account for the wagering game player 114. The server credential module 108 can store this association between the value of the security token 118 and the player account in the nonvolatile machine-readable media 110.

After validation, the server credential module 108 in the wagering game server 106 can transmit the communication 136 (shown as reference point D) back to the mobile device 104 that indicates that the remote login is validated for the wagering game machine 102 using the mobile device 104. Also after validation, the server credential server 108 can transmit the communication 138 (shown as reference point E) back to the wagering game machine 102 that provides validation of login of the player account for the wagering game player 114. Alternatively or in addition, the communication 136 can include a player profile for the wagering game player 114 that is associated with their player account that is stored in the nonvolatile machine-readable media 110. The player profile can include the different achievements, points, awards, current level available for the wagering game player for this wagering game machine, current unlocked content available for the wagering game player for this wagering game machine, etc.

Upon receipt of the communication 136, the wagering game player 114 is logged into their player account at the wagering game machine 102 through a remote login. Accordingly, some example embodiments enable a wagering game player to provide their login credentials using a mobile device instead of inputting these credentials at the wagering game machine. Therefore, some example embodiments provide protection for wagering game players having their login credentials (e.g., username and password) being stolen during login into their account at wagering game machines at wagering game establishments.

Accordingly as described, in some example embodiments, a wagering game player can provide the security token through any device that has network access. In some example embodiments, a wagering game player can dictate which device is to be used. In particular, as part of selecting the remote login, the wagering game player 114 can be given the option to provide an identification of the device where the remote login must occur. For example, the wagering game player 114 can indicate that a mobile device is to be used and the telephone number of the mobile device. In another example, the wagering game player 114 can indicate that a kiosk at the wagering game establishment where wagering game machine 102 is located is to be used. Such embodiments provide further security by enabling the wagering game player 114 to specify the separate device to be used for the remote login. In such embodiments, the communication 130 can include the identification of the device to be used for the remote login. The server credential module 108 at the wagering game server 106 can verify that this device is being used for the remote login.

FIG. 2 depicts a Graphical User Interface (GUI) being displayed on a display of a wagering game machine for providing the option for performing remote login at the wagering game machine, according to some example embodiments. In particular, FIG. 2 depicts a GUI being displayed on a display 200. The GUI includes an interface to allow the wagering game player to login using remote login (as described herein) or a standard login (where the wagering game player inputs their login credentials at the wagering game machine). A section 202 provides for the remote login, and a section 204 provides for the standard login. The section 202 includes a login button 208 and a display box for presenting the security token 206. Accordingly, upon selection of the login button 208 by the wagering game player, a value of the security token 206 is presented in the display box.

Alternatively, the wagering game player can perform a standard login using the inputs in section 204. The section 204 includes a create button 210 that enables the wagering game player to create a player account. In response to selection of the create button 210, a different screen (not shown) can be displayed to enable the wagering game player to create their player account. The section 204 also includes an input box 212 for inputting a username and an input box 214 for inputting a password for an existing player account for the wagering game player. The section 204 also includes a login button 216. Accordingly, the wagering game player can perform a standard login by inputting their username into the input box 212 and their password into the input box 214. The wagering game player can then select the login button 214 to provide their username and password for authentication.

Example Mobile Device

This section describes an example mobile device and presents structural aspects of some embodiments. This section will discuss FIGS. 3-4. The discussion of FIG. 3 will describe a block diagram of relevant parts of a mobile device architecture. The discussion of FIG. 4 will describe a Graphical User Interface (GUI) for inputting a security token and that is presented on a display of a mobile device. While FIGS. 3-4 illustrate a mobile device for inputting a security token for remote login at a wagering game machine, some example embodiments can incorporate any device separate from the wagering game machine for inputting of the security token.

Figure 3:
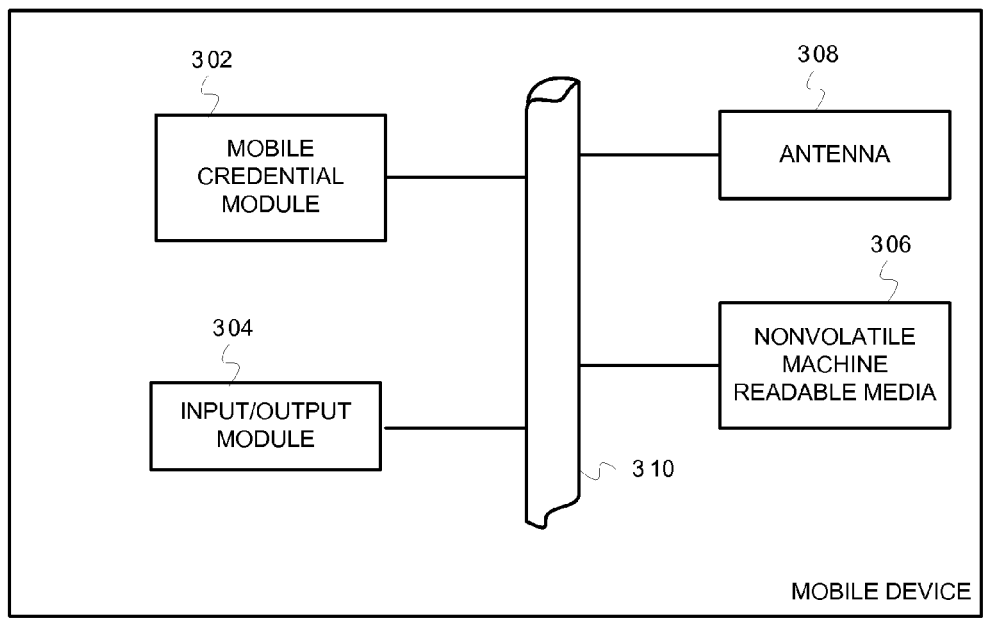
FIG. 3 depicts a block diagram illustrating a mobile device architecture, according to some example embodiments.

FIG. 3 depicts a block diagram illustrating a mobile device architecture, according to some example embodiments. FIG. 3 depicts a mobile device 300 that can be representative of the mobile device 104 of FIG. 1. The mobile device 300 includes a mobile credential module 302, an Input/Output (I/O) module 304, a nonvolatile machine-readable media 306, and an antenna 308 that are communicatively coupled together through a communication bus 310.

The mobile credential module 302 and the I/O module 304 can be software, firmware, hardware or a combination thereof. For example, the mobile credential module 302 and the I/O module 304 can be software executing on a processor or other type of hardware (not shown). The mobile credential module 302 can perform the operations for providing remote login at a wagering game machine at the mobile device 300 (as described herein). The I/O module 304 can receive and transmit data communications for remote login (as described herein). For example, the I/O module 304 can use the antenna 308 to receive and transmit communications from and to the wagering game server. The nonvolatile-machine-readable media 306 can store data that identifies the mobile device (e.g., the associated telephone number). In some example embodiments, this identification can be provided to the wagering game server as part of the authentication for the remote login.

FIG. 4 depicts a Graphical User Interface (GUI) on a display of a mobile device for inputting a security token for remote login at a wagering game machine, according to some example embodiments. In particular, FIG. 4 illustrates a mobile device 400 that includes a display 402 having a GUI for remote login to a wagering game machine. The mobile device 400 can be representative of the mobile device 104 of FIG. 1. The mobile device 400 includes a speaker 414 and a microphone 412. The GUI shown in FIG. 4 can be displayed after the wagering game player has logged into their player account through their mobile device 400.

The GUI includes an input box 404 to input the security token that was displayed on the display of the wagering game machine. The GUI also includes an information point 410 that instructs the wagering game player to enter the security token in the input box 404. The GUI includes an OK button 406 and a cancel button 408. After inputting the security token into the input box 404, the wagering game player can select the OK button 406 to transmit the security token along with the login credentials for the wagering game player back to the wagering game server (as described above).

Example Operations

This section describes operations associated with some example embodiments. In the discussion below, the flow charts will be described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
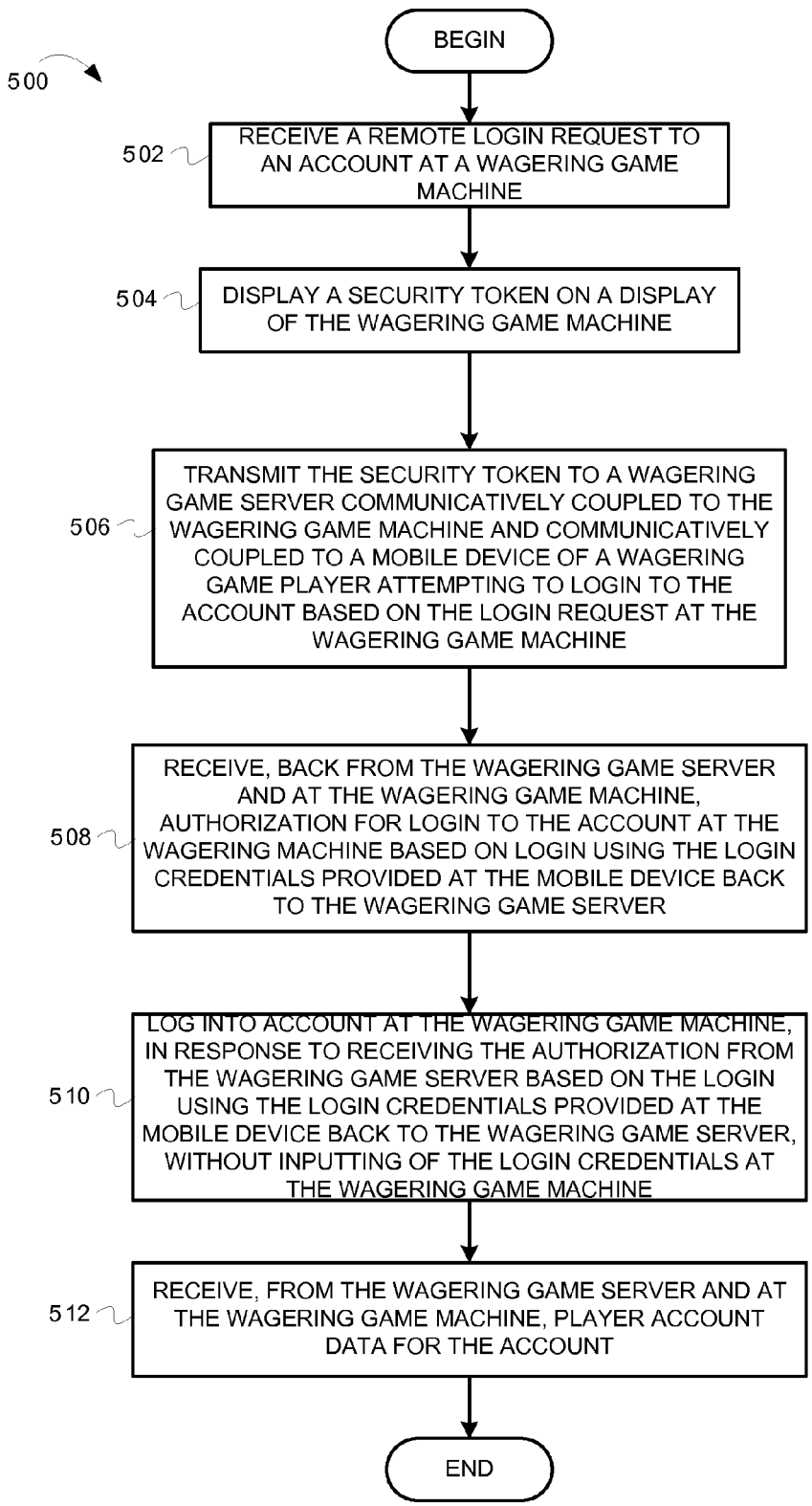
FIG. 5 depicts a flowchart for operations performed at a wagering game machine for performing remote login at the wagering game machine, according to some example embodiments.
Figure 6:
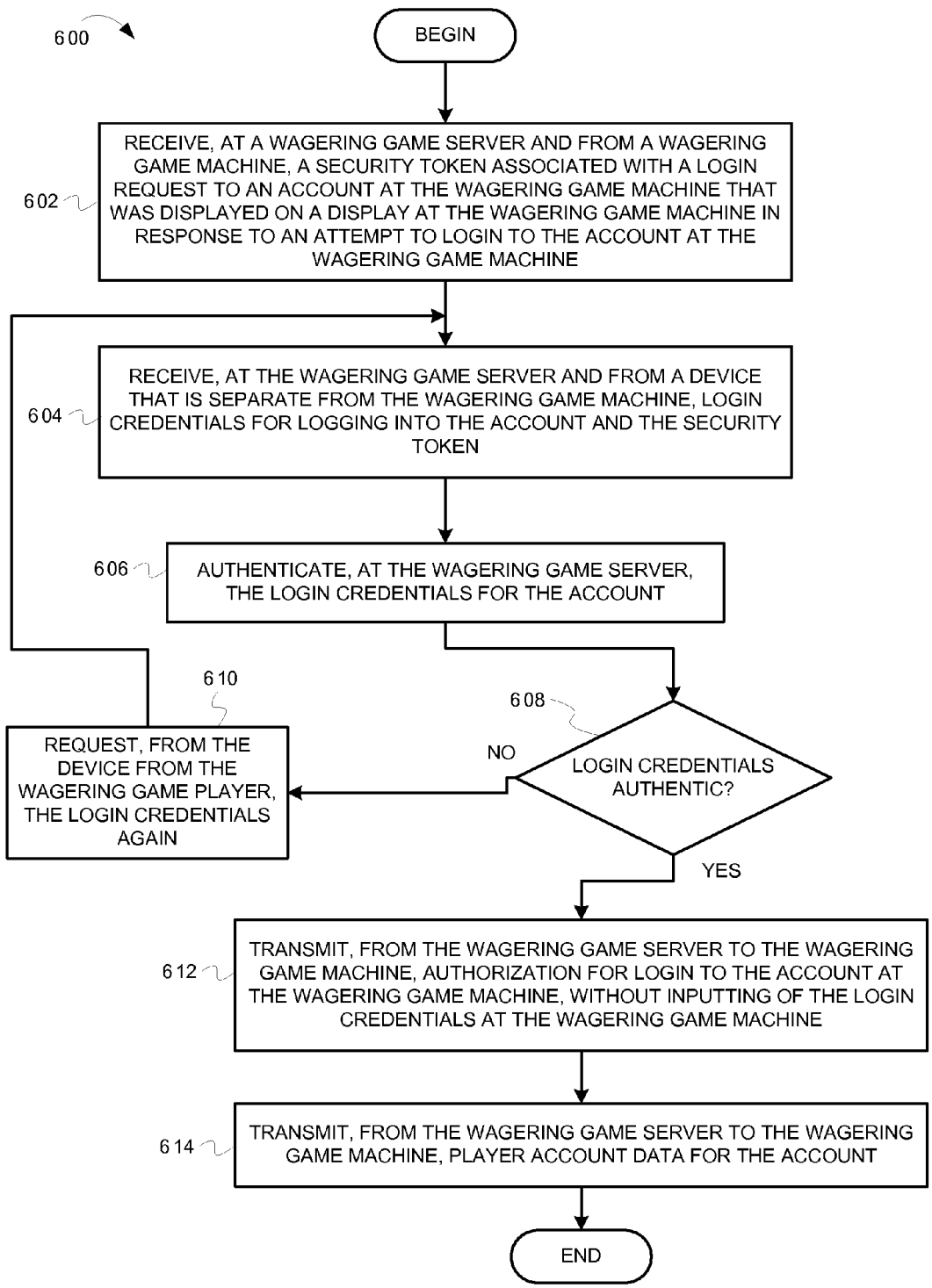
FIG. 6 depicts a flowchart for operations performed at a wagering game server for performing remote login at the wagering game machine, according to some example embodiments.
Figure 7:
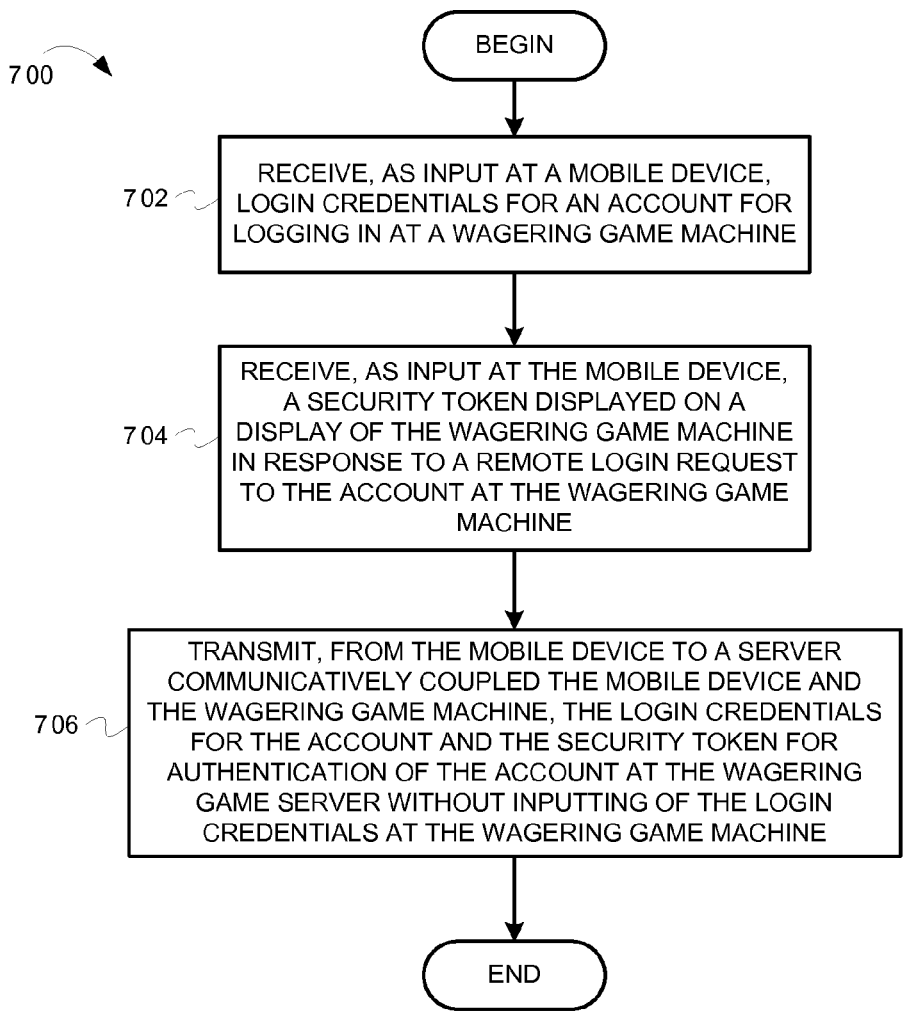
FIG. 7 depicts a flowchart for operations performed at a device for performing remote login at the wagering game machine, according to some example embodiments.

The section will discuss FIGS. 5-7. The discussion of FIGS. 5-7 will describe operations for performing remote login at a wagering game machine using a security token. The three different flowcharts in FIGS. 5-7 are from three different perspectives (a wagering game machine, a wagering game server, and a mobile device). In particular, the discussion of FIG. 5 will describe operations performed at a wagering game machine for performing remote login at the wagering game machine using a security token. The discussion of FIG. 6 will describe operations performed at a wagering game server for performing remote login at the wagering game machine using a security token. The discussion of FIG. 7 will describe operations performed at a mobile device for performing remote login at the wagering game machine using a security token.

Figure 8:
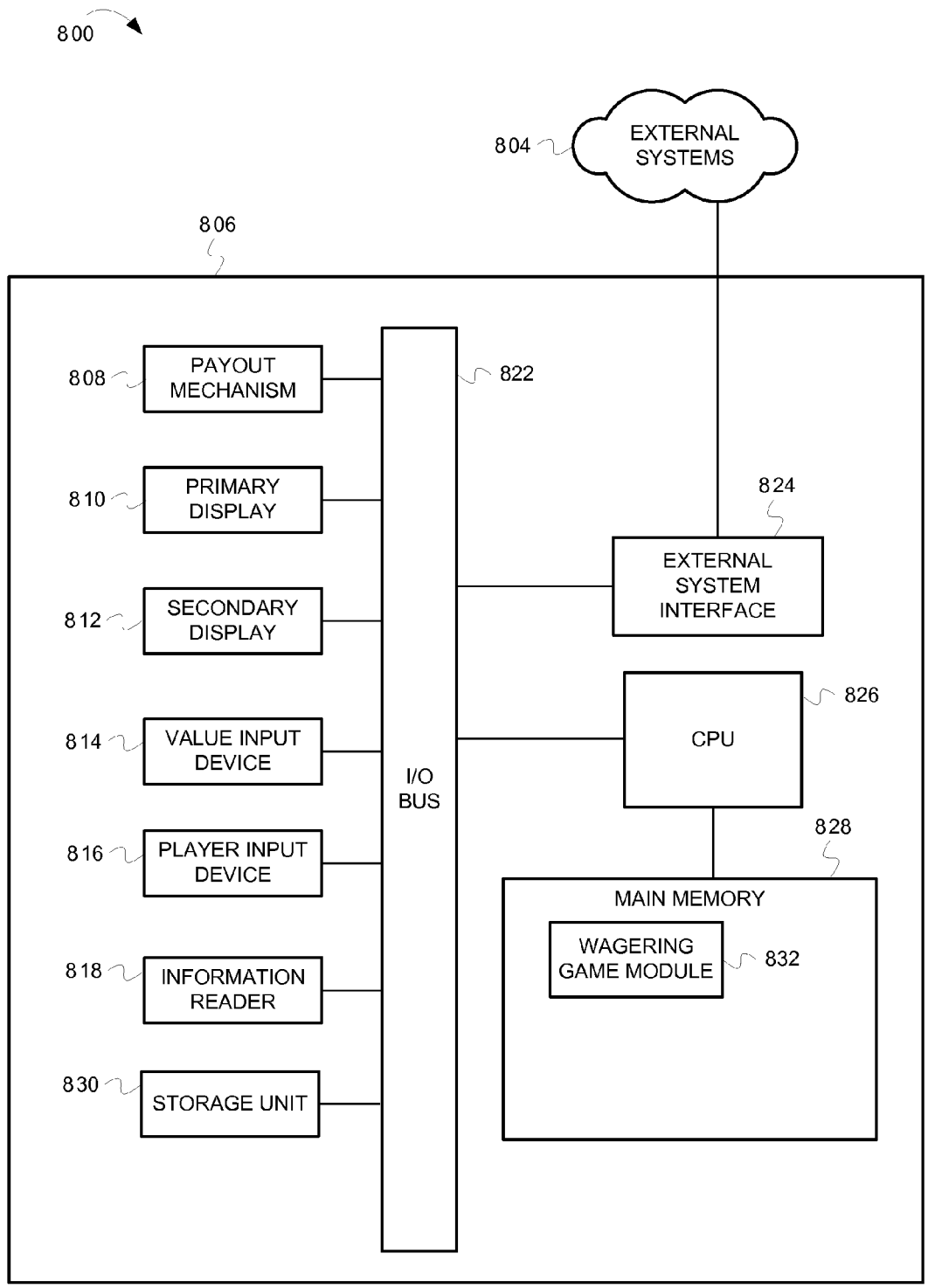
FIG. 8 depicts a block diagram illustrating a wagering game machine architecture, according to some example embodiments.

FIG. 5 depicts a flowchart for operations performed at a wagering game machine for performing remote login at the wagering game machine, according to some example embodiments. The operations of a flowchart 500 are described in reference to FIG. 1. In some example embodiments, the operations are performed by a wagering game module (not shown) within the wagering game machine 102 of FIG. 1. An example of the wagering game module in a wagering game machine is illustrated in FIG. 8, which is described in more detail below. The operations of the flowchart 500 begin at block 502.

At block 502, the wagering game module in the wagering game machine 102 receives a remote login request to an account at the wagering game machine 102. With reference to FIG. 1, the wagering game module in the wagering game machine 102 receives the remote login request for the player account for the wagering game player 114 based on input from the wagering game player. With reference to FIG. 2, the wagering game player 114 can select the login button 208 for login into their account from their mobile device. Operations of the flowchart 500 continue at block 504.

At block 504, the wagering game module displays a security token on a display of the wagering game machine. With reference to FIG. 1, the wagering game module can generate the security token locally at the wagering game machine 102 or request and receive the security token from the wagering game server 106. The wagering game module can then display the security token 118 on the display 116 of the wagering game machine 102. Operations of the flowchart 500 continue at block 506.

At block 506, the wagering game module transmits the security token to a wagering game server communicatively coupled to the wagering game machine and communicatively coupled to a mobile device of a wagering game player attempting to login to the account based on the login request at the wagering game machine. With reference to FIG. 1, the wagering game module in the wagering game machine 102 transmits the value of the security token 118 to the wagering game server 106. Operations of the flowchart 500 continue at block 508.

At block 508, the wagering game module receives, back from the wagering game server, authorization for login to the account at the wagering machine based on login using the login credentials provided at the mobile device back to the wagering game server. With reference to FIG. 1, the wagering game module in the wagering game machine 102 receives, back from the wagering game server 106 authorization for login to the account for the wagering game player 114 (shown as the communication 138). The wagering game module can receive this authorization in response to polling of the wagering game server 106 (shown as the communication 132). Operations of the flowchart 500 continue at block 510.

At block 510, the wagering game module logs into the account at the wagering game machine, in response to receiving the authorization from the wagering game server based on the login using the login credentials provided at the mobile device back to the wagering game server, without inputting of the login credentials at the wagering game machine. With reference to FIG. 1 after receiving the authorization, the wagering game module enables the wagering game player 114 to access their player account at the wagering game machine 102 without requiring the wagering game player 114 to login to their player account at the wagering game machine 102. Operations of the flowchart 500 continue at block 510.

At block 512, the wagering game module receives, from the wagering game server and at the wagering game machine, player account data for the account. With reference to FIG. 1, the wagering game module in the wagering game machine 102 receives player account data from the wagering game server 106. The player account data can include a player profile for the wagering game player 114 (that can include the different achievements, points, awards, current level available for the wagering game player for this wagering game machine, current unlocked content available for the wagering game player for this wagering game machine, etc.). Operations of the flowchart 500 are complete.

FIG. 6 depicts a flowchart for operations performed at a wagering game server for performing remote login at the wagering game machine, according to some example embodiments. The operations of a flowchart 600 are described in reference to FIG. 1. In some example embodiments, the operations are performed by the server credential module 108 within the wagering game server 106 of FIG. 1. The operations of the flowchart 600 begin at block 602.

At block 602, the server credential module 108 receives from a wagering game machine, a security token associated with a login request to an account at the wagering game machine that was displayed on a display at the wagering game machine in response to an attempt to login to the account at the wagering game machine. With reference to FIG. 1, the server credential module 108 in the wagering game server 106 receives from the wagering game machine the security token 118 (shown as the communication 130). Operations of the flowchart 600 continue at block 604.

At block 604, the server credential module 108 receives, from a device that is separate from the wagering game machine, login credentials for logging into the account and the security token. With reference to FIG. 1, the server credential module 108 receives, from the mobile device 104, login credentials for logging into the player account for the wagering game player 114 along with the value of the security token 118 (that was input to the mobile device 104 by the wagering game player 114) (shown as the communication 134). Operations of the flowchart 600 continue at block 606.

At block 606, the server credential module 108 authenticates the login credentials for the account. With reference to FIG. 1, the server credential module 108 authenticates the login credentials for the player account. For example, the server credential module 108 verifies that the username and password are correct. Operations of the flowchart 600 continue at block 608.

At block 608, the server credential module 108 determines whether the login credentials are authentic. If the login credentials are not authentic, operations of the flowchart 600 continue at block 610. Otherwise, operations of the flowchart 600 continue at block 612.

At block 610, the server credential module 108 requests, from the device from the wagering game player, the login credentials again. With reference to FIG. 1, the server credential module 108 requests the login credentials from the wagering game player 114 again (based on a communication transmitted back to the mobile device 104). The mobile device 104 can display an indication that the login was incorrect and a request to reentry the login credentials for their player account. This request to reenter the login credentials can continue for a defined number of times until the wagering game player 114 is locked out of their account (thereby requiring the wagering game player 114 to take steps to unlock their account). Operations of the flowchart 600 continue at block 612.

At block 612, the server credential module 108 transmits, to the wagering game machine, authorization for login to the account at the wagering game machine, without inputting of the login credentials at the wagering game machine. With reference to FIG. 1, the server credential module 108 transmits authorization to the wagering game machine 102 for login to the player account for the wagering game player 114 (shown as the communication 138). Operations of the flowchart 600 continue at block 614.

At block 614, the server credential module 108 transmits, to the wagering game machine, player account data for the account. With reference to FIG. 1, the server credential module 108 transmits the player account data for the player account for the wagering game player 114. Operations of the flowchart 600 are complete.

FIG. 7 depicts a flowchart for operations performed at a device for performing remote login at the wagering game machine, according to some example embodiments. The operations of a flowchart 700 are described in reference to FIGS. 1 and 3. In some example embodiments, the operations are performed by the mobile credential module 302 in the mobile device 300 of FIG. 3. The operations of the flowchart 700 begin at block 702.

At block 702, the mobile credential module 302 receives, as input at the mobile device, login credentials for an account for logging in at a wagering game machine. With reference to FIGS. 1 and 3, the mobile credential module 302 receives, as input at the mobile device 104, login credentials for the player account for the wagering game player 114 (based on input from the wagering game player 114). In some example embodiments, the wagering game player 114 may already been logged into their player account at the mobile device 104. In such embodiments, this operation is not required at this point. Operations of the flowchart 700 continue at block 704.

At block 704, the mobile credential module 302 receives, as input at the mobile device, a security token displayed on a display of the wagering game machine in response to a remote login request to the account at the wagering game machine. With reference to FIGS. 1 and 3, the mobile credential module 302 receives, as input at the mobile device 104 by the wagering game player 114, the value of the security token 118 displayed at the wagering game machine 102. Operations of the flowchart 700 continue at block 706.

At block 706, the mobile credential module 302 transmits, from the mobile device to a server communicatively coupled the mobile device and the wagering game machine, the login credentials for the account and the security token for authentication of the account at the wagering game server without inputting of the login credentials at the wagering game machine. With reference to FIGS. 1 and 3, the mobile credential module 302 transmits the login credentials and the value of the security token 118 to the wagering game server 106 for authentication (shown as the communication 134). Operations of the flowchart 700 are complete.

Wagering Game Machine Architecture and Network Environment

This section describes an example wagering game architecture and network environment of some example embodiments.

Wagering Game Machine Architecture

FIG. 8 depicts a block diagram illustrating a wagering game machine architecture, according to some example embodiments. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game module 832. In one embodiment, the wagering game module 832 can present wagering games, such as video poker, video black jack, video slots, video lottery, etc., in whole or part. The wagering game module 832 can also perform operations for performing the remote login request to a player account at the wagering game machine 806 (as described above).

The CPU 826 is also connected to an input/output (I/O) bus 822, which can include any suitable bus technologies, such as an AGTL+frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion of wagering game networks.

Wagering Game Network

Figure 9:
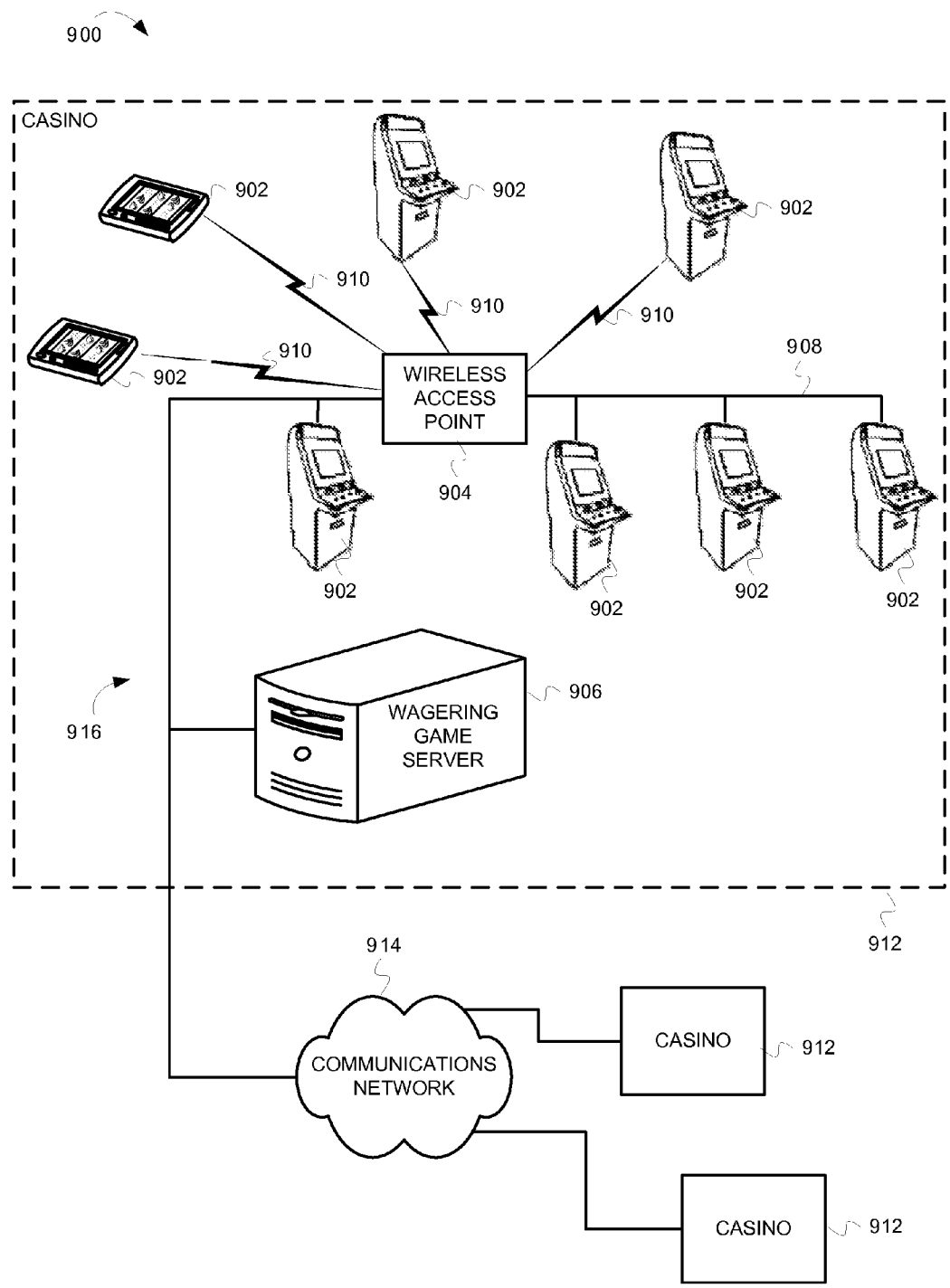
FIG. 9 depicts a block diagram illustrating a wagering game network, according to some example embodiments.

FIG. 9 depicts a block diagram illustrating a wagering game network, according to some example embodiments. As shown in FIG. 8, the wagering game network 900 includes a plurality of casinos 912 connected to a communications network 914. In some example embodiments, operations for the remote login for a wagering game machine (as described herein) can be performed in the wagering game network 900.

Each casino 912 includes a local area network 916, which includes an access point 904, a wagering game server 906, and wagering game machines 902. The access point 9304 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machine

Figure 10:
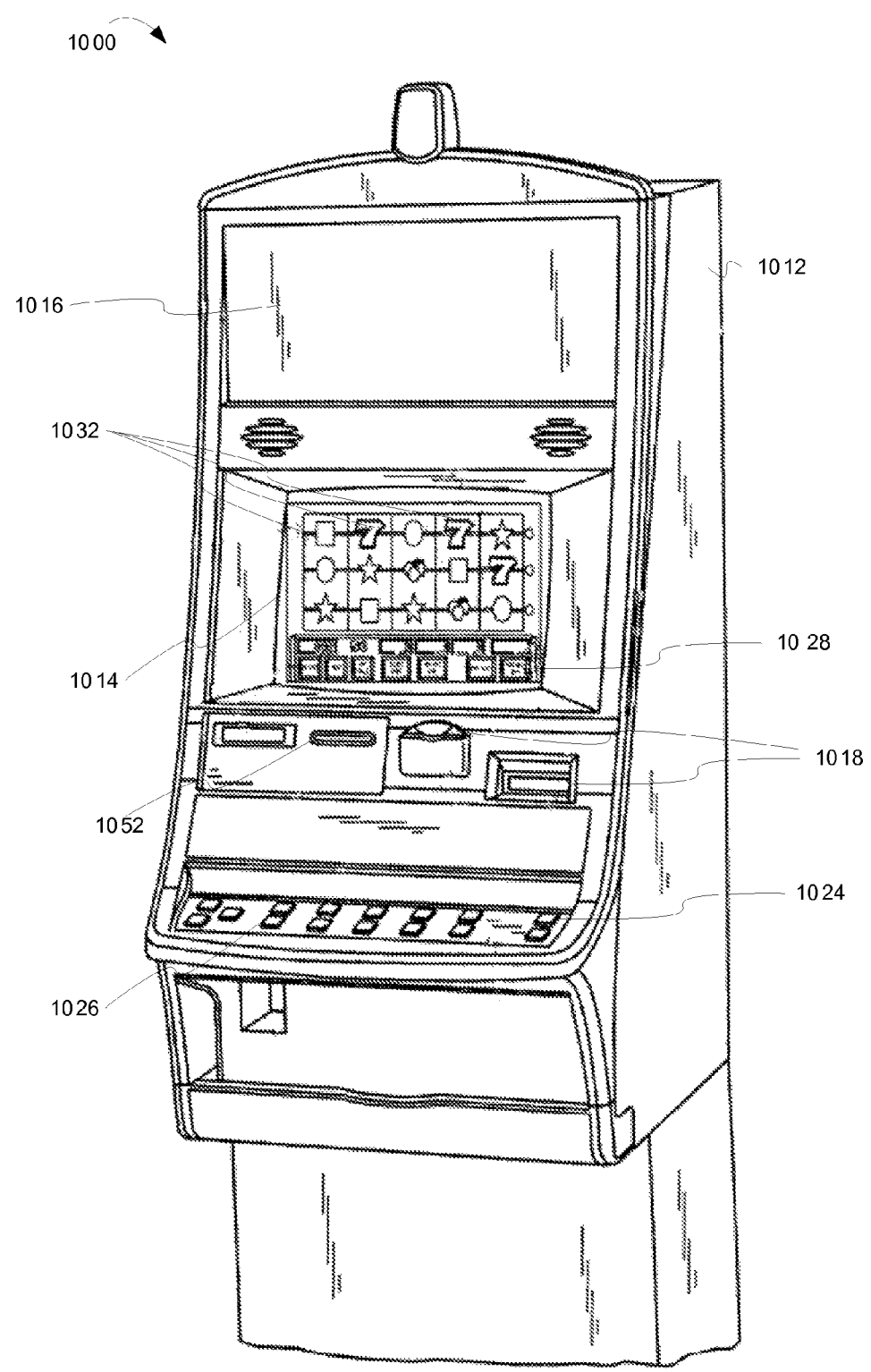
FIG. 10 depicts a perspective view of a wagering game machine, according to some example embodiments.

FIG. 10 depicts a perspective view of a wagering game machine, according to some example embodiments. Referring to FIG. 9, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console mode A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
receiving a login request to an account at a wagering game machine; and
in response to the login request,
displaying a security token on a display of the wagering game machine;
transmitting the security token to a server, wherein the server is communicatively coupled to the wagering game machine and a mobile device;
receiving, back from the server and at the wagering game machine, authorization for login to the account at the wagering machine, wherein the authorization is based on an earlier login to the account from the mobile device using the login credentials; and
after receiving the authorization, logging into the account at the wagering game machine, wherein the logging occurs without inputting of the login credentials at the wagering game machine.

2. The method of claim 1, wherein the security token comprises a unique identifier for the wagering game machine for a defined time period.

3. The method of claim 1, further comprising generating the security token by a module within the wagering game machine.

4. The method of claim 1, wherein the mobile device is associated with a wagering game player attempting to login to the account based on the login request at the wagering game machine.

5. The method of claim 1, further comprising receiving, from the server and at the wagering game machine, player account data for the account.

6. The method of claim 1, further comprising receiving the security token from the wagering game server in response to the login request.

7. A method comprising:
receiving, at a server and from a wagering game machine, an indication of a login request to an account at the wagering game machine, wherein a security token was displayed on a display at the wagering game machine in response to an attempt to login to the account at the wagering game machine;
receiving, at the server and from a device that is separate from the wagering game machine, the security token and login credentials for logging into the account;
authenticating, at the server, the login credentials for the account; and
responsive to the login credentials being authentic for the account, transmitting, from the server to the wagering game machine, authorization for login to the account at the wagering game machine, without receipt of the login credentials at the wagering game machine.

8. The method of claim 7, further comprising:
responsive to the login credentials being authentic for the account, transmitting, from the server to the wagering game machine, player account data for the account.

9. The method of claim 7, wherein the device that is separate from the wagering game machine comprises a mobile device.

10. The method of claim 7, wherein the security token comprises a unique identifier for the wagering game machine for a defined time period.

11. The method of claim 7, further comprising:
generating, at the server, the security token; and
transmitting, from the server and to the wagering game machine, the security token.

12. One or more machine-readable storage media including instructions which, when executed by one or more processors, cause the one or more processors to perform operations comprising:
receiving, as input at a mobile device, login credentials for an account for logging in at a wagering game machine;
receiving, as input at the mobile device, a security token displayed on a display of the wagering game machine in response to an attempt to perform a remote login to the account at the wagering game machine; and
transmitting, from the mobile device to a server communicatively coupled the mobile device and the wagering game machine, the login credentials for the account and the security token for authentication of the account at the server without inputting of the login credentials at the wagering game machine.

13. The one or more machine-readable storage media of claim 12, wherein the security token comprises a unique identifier for the wagering game machine for a defined time period.

14. The one or more machine-readable storage media of claim 12, wherein the mobile device is associated with a wagering game player attempting to login to the account based on the login request at the wagering game machine.

15. The one or more machine-readable storage media of claim 12, wherein the operations are configured to transmit, from the mobile device to the server, an identification of the mobile device, wherein the server is configured to use the identification of the mobile device as part of the authentication of the account.

16. A wagering game machine comprising:
a processor;
a wagering game module operable on the processor, the wagering game module configured to:
present a wagering game on which monetary value can be wagered;
receive a login request to an account at the wagering game machine; and
in response to the login request,
display a security token on a display of the wagering game machine;
transmit the security token to a server, wherein the server is communicatively coupled to the wagering game machine and a mobile device;
receive, back from the server, authorization for login to the account at the wagering machine, wherein the authorization is based on an earlier login to the account from the mobile device using the login credentials; and
after receipt of the authorization, log into the account at the wagering game machine, wherein the logging occurs without inputting of the login credentials at the wagering game machine.

17. The wagering game machine of claim 16, wherein the security token comprises a unique identifier for the wagering game machine for a defined time period.

18. The wagering game machine of claim 16, further comprising generating the security token by a module within the wagering game machine.

19. The wagering game machine of claim 16, wherein the mobile device is associated with a wagering game player attempting to login to the account based on the login request at the wagering game machine.

20. The wagering game machine of claim 16, further comprising receiving, from the server, player account data for the account.

21. An apparatus comprising:
means for receiving, at a server and from a wagering game machine, an indication of a login request to an account at the wagering game machine, wherein a security token was displayed on a display at the wagering game machine in response to an attempt to login to the account at the wagering game machine;
means for receiving, at the server and from a device that is separate from the wagering game machine, the security token and login credentials for logging into the account;
means for authenticating, at the server, the login credentials for the account; and
responsive to the login credentials being authentic for the account, means for transmitting, from the server to the wagering game machine, authorization for login to the account at the wagering game machine, without receipt of the login credentials at the wagering game machine.

22. The apparatus of claim 21, further comprising:
responsive to the login credentials being authentic for the account, means for transmitting, from the server to the wagering game machine, player account data for the account.

23. The apparatus of claim 21, wherein the device that is separate from the wagering game machine comprises a mobile device.

24. The apparatus of claim 21, wherein the security token comprises a unique identifier for the wagering game machine for a defined time period.

25. The apparatus of claim 21, further comprising:
means for generating, at the server, the security token; and
means for transmitting, from the server and to the wagering game machine, the security token.

* * * * *